US011180218B2

(12) United States Patent
Tsutsui et al.

(10) Patent No.: US 11,180,218 B2
(45) Date of Patent: Nov. 23, 2021

(54) DRIVE UNIT

(71) Applicant: HONDA MOTOR CO., LTD., Tokyo (JP)

(72) Inventors: Masayuki Tsutsui, Wako (JP); Hiroyasu Yoshizawa, Wako (JP); Tomochika Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 143 days.

(21) Appl. No.: 16/715,081

(22) Filed: Dec. 16, 2019

(65) Prior Publication Data
US 2020/0198729 A1    Jun. 25, 2020

(30) Foreign Application Priority Data

Dec. 19, 2018 (JP) .............................. JP2018-237417

(51) Int. Cl.
| | | |
|---|---|---|
| *B62M 11/04* | (2006.01) | |
| *B62M 6/55* | (2010.01) | |
| *B62M 6/50* | (2010.01) | |
| *F16D 41/24* | (2006.01) | |

(Continued)

(52) U.S. Cl.
CPC .............. *B62M 11/04* (2013.01); *B62M 6/50* (2013.01); *B62M 6/55* (2013.01); *F16D 41/24* (2013.01);
(Continued)

(58) Field of Classification Search
CPC ........ B62M 11/04; B62M 11/06; B62M 6/55; F16D 41/24; F16D 3/08
See application file for complete search history.

(56) References Cited

U.S. PATENT DOCUMENTS 2,725,759 A * 12/1955 Kreidler ................. B62M 25/00
180/205.4
5,749,429 A * 5/1998 Yamauchi ........... B60L 15/2054
180/206.4

(Continued)

FOREIGN PATENT DOCUMENTS

| CN | 204794550 | 11/2015 |
|---|---|---|
| JP | 07-010068 | 1/1995 |

(Continued)

OTHER PUBLICATIONS

Japanese Notice of Allowance for Japanese Patent Application No. 2018-237417 dated Jun. 30, 2020.

*Primary Examiner* — Minnah L Seoh
*Assistant Examiner* — Michael R Stabley
(74) *Attorney, Agent, or Firm* — Amin, Turocy & Watson, LLP

(57) ABSTRACT

A drive unit includes: a pedal crankshaft to which a pedal stepping force of a rider is applied; an electric motor that detects a torque input to the pedal crankshaft and generates a drive force; and a transmission that changes shift of the drive force of the electric motor and delivers the drive force to the pedal crankshaft, the transmission includes a main shaft that supports a plurality of drive gears and a counter shaft that supports a plurality of driven gears that engage with the plurality of respective drive gears, and the transmission selects one torque delivery gear among the plurality of drive gears, delivers the drive force of the electric motor to the counter shaft, and shifts the torque delivery gear without inverting a rotational direction of the drive gear.

9 Claims, 8 Drawing Sheets

(51) Int. Cl.
*F16H 3/091* (2006.01)
*F16H 61/664* (2006.01)
*F16H 3/10* (2006.01)
*B60K 17/02* (2006.01)
*F16H 3/08* (2006.01)
*F16H 59/14* (2006.01)

(52) U.S. Cl.
CPC ............ *F16H 3/0915* (2013.01); *F16H 3/10* (2013.01); *F16H 61/6647* (2013.01); *B60K 17/02* (2013.01); *F16H 59/141* (2013.01); *F16H 2003/0803* (2013.01); *F16H 2059/147* (2013.01); *F16H 2200/0013* (2013.01)

(56) References Cited

U.S. PATENT DOCUMENTS

| | | | | |
|---|---|---|---|---|
| 5,758,736 A * | 6/1998 | Yamauchi | ................ | B62M 6/55 180/220 |
| 5,845,727 A * | 12/1998 | Miyazawa | ................ | B62M 6/55 180/206.4 |
| 5,909,781 A * | 6/1999 | Yonekawa | ................ | B62M 6/45 180/206.4 |
| 8,777,791 B1 * | 7/2014 | Hino | ................ | B60W 20/40 475/5 |
| 9,199,630 B2 * | 12/2015 | Gao | ................ | B62M 6/55 |
| 9,758,213 B2 * | 9/2017 | Kawakami | ................ | B62M 6/55 |
| 9,873,480 B2 * | 1/2018 | Yamamoto | ................ | B62M 11/18 |
| 9,994,284 B2 * | 6/2018 | Urabe | ................ | B60L 50/60 |
| 10,000,255 B2 * | 6/2018 | Shahana | ................ | B62M 6/55 |
| 2016/0280328 A1 * | 9/2016 | Yamamoto | ................ | B62M 11/14 |
| 2016/0288872 A1 * | 10/2016 | Shahana | ................ | B62K 25/286 |
| 2017/0217538 A1 * | 8/2017 | Yamamoto | ................ | B62M 11/145 |

FOREIGN PATENT DOCUMENTS

| | | |
|---|---|---|
| JP | 08-121554 | 5/1996 |
| JP | 2001-260979 | 9/2001 |
| JP | 2004-001665 | 1/2004 |
| JP | 2014-199105 | 10/2014 |

* cited by examiner

DRIVE UNIT

CROSS-REFERENCE TO RELATED APPLICATION

Priority is claimed on Japanese Patent Application No. 2018-237417, filed on Dec. 19, 2018, the contents of which are incorporated herein by reference.

BACKGROUND

Field of the Invention

The present invention relates to a drive unit.

Background

In the related art, an assist bicycle that includes a transmission between a pedal crankshaft and an assist motor has been disclosed (see Japanese Unexamined Patent Application, First Publication No. 2001-260979, for example).

SUMMARY

According to the transmission disclosed in Japanese Unexamined Patent Application, First Publication No. 2001-260979, a pair of drive gears are supported at a main shaft on a motor side (input side), and a pair of driven gears are supported at a counter shaft on a crank side (output side). The pair of driven gears are supported via one-way clutches. One of the pair of drive gears engages with a corresponding driven gear via a relay gear. A gear array including the relay gear increases a deceleration ratio (approaches a low-speed side) with respect to a gear array that does not include the relay gear and inverts a rotational direction of the driven gear. If an assist motor rotates (forward), then a counter shaft rotates via the gear array including the relay gear. At that time, the driven gear in the gear array that does not include the relay gear idles via the one-way clutch. If the rotation of the assist motor is switched from forward rotation to backward rotation after a rotation speed of the counter shaft is raised, then the counter shaft rotates via the gear array that does not include the relay gear.

In this manner, the aforementioned configuration in the related art is adapted to change the deceleration ratio and to change shift by switching the rotation of the assist motor from forward rotation to backward rotation. Therefore, there is a problem that a continuous shift changing operation cannot be performed smoothly.

An objective of an aspect of the invention is to provide a drive unit that includes a transmission capable of smoothly performing a continuous shift changing operation.

(1) An aspect of the invention is a drive unit including: a pedal crankshaft to which a pedal stepping force of a rider is applied; an electric motor that detects a torque input to the pedal crankshaft and generates a drive force; and a transmission that changes shift of the drive force of the electric motor and delivers the drive force to the pedal crankshaft, in which the transmission includes a main shaft that supports a plurality of drive gears and a counter shaft that supports a plurality of driven gears that engage with the plurality of respective drive gears, and the transmission selects one torque delivery gear from the plurality of drive gears, delivers the drive force of the electric motor to the counter shaft, and shifts the torque delivery gear without inverting a rotational direction of the drive gear.

With this configuration, it is possible to change shift while the electric motor and the main shaft and the counter shaft of the transmission rotate in the same direction without inverting the rotational direction before and after the shift changing and to thereby cause the electric motor and the main shaft and the counter shaft of the transmission to smoothly operate. That is, the drive unit according to the present application can smoothly perform a continuous shift changing operation without interrupting pedaling assist for a rider as compared with a configuration in which shift changing is performed by inversely rotating a motor as in the related art.

(2) The aforementioned drive unit may further include a one-way clutch that is provided on a power delivery path from the electric motor to the pedal crankshaft and blocks delivery of a pedal torque, which has been input to the pedal crankshaft, to a side of the electric motor.

With this configuration, it is possible to prevent the pedal torque from being delivered to the side of the electric motor and to prevent the electric motor and the like from rotating when the pedal stepping of the rider is accelerated, and a rotation speed of the pedal crankshaft increases, and it is thus possible to curb a torque loss due to friction.

(3) In the aforementioned drive unit, the one-way clutch may be provided on a delivery path from the counter shaft to the pedal crankshaft.

With this configuration, it is possible to prevent the pedal torque from being delivered to the transmission side and to prevent the transmission from rotating when the pedal stepping of the rider is accelerated, and a rotation speed of the pedal crankshaft increases, and it is thus possible to curb a torque loss due to friction.

(4) In the aforementioned drive unit, the one-way clutch may be provided coaxially with the counter shaft.

With this configuration, it is possible to dispose the one-way clutch using spare space in the surroundings of the transmission having the plurality of gears and thereby to downsize the drive unit by disposing the one-way clutch coaxially with the counter shaft.

(5) In the aforementioned drive unit, the counter shaft may be disposed above the pedal crankshaft and the main shaft.

With this configuration, it becomes easier to secure a minimum height from the ground, and it is possible to curb the length in the forward-backward direction from the transmission to the pedal crankshaft by disposing the counter shaft above the pedal crankshaft and the main shaft.

(6) In the aforementioned drive unit, the main shaft may be disposed below the pedal crankshaft, and a drive shaft of the electric motor may be disposed above the main shaft.

With this configuration, it is possible to reduce the length of the entire drive unit in the forward-backward direction and to downsize the drive unit by disposing the main shaft below the pedal crankshaft and disposing the electric motor above the main shaft.

(7) In the aforementioned drive unit, a drive shaft of the electric motor may be disposed further forward than the pedal crankshaft.

With this configuration, it is possible to efficiently dispose the electric motor by disposing the electric motor further forward than the pedal crankshaft in a configuration in which a rear wheel is disposed behind the pedal crankshaft.

(8) In the aforementioned drive unit, the main shaft may be disposed further forward than the pedal crankshaft.

With this configuration, it is possible to efficiently dispose the main shaft by disposing the main shaft further forward than the pedal crankshaft in a configuration in which a rear wheel is disposed behind the pedal crankshaft.

(9) In the aforementioned drive unit, the transmission may include a gear position sensor.

With this configuration, it is possible to detect a gear position in stepped shift changing using a plurality of gears and to use the gear position for fine control of the electric motor.

(10) In the aforementioned drive unit, the gear position sensor may be disposed below the main shaft.

With this configuration, it is possible to dispose the gear position sensor using spare space in the surroundings of the transmission having a plurality of gears and to downsize the drive unit by disposing the gear position sensor below the main shaft.

(11) The aforementioned drive unit may further include a deceleration gear pair on a delivery path from the electric motor to the main shaft.

With this configuration, it is possible to deliver the drive force of the electric motor to the transmission after appropriately decelerating and adjusting the drive force.

According to the aspect of the invention, it is possible to provide a drive unit that includes a transmission capable of smoothly performing a continuous shift changing operation.

DESCRIPTION OF EMBODIMENTS

Figure 1:
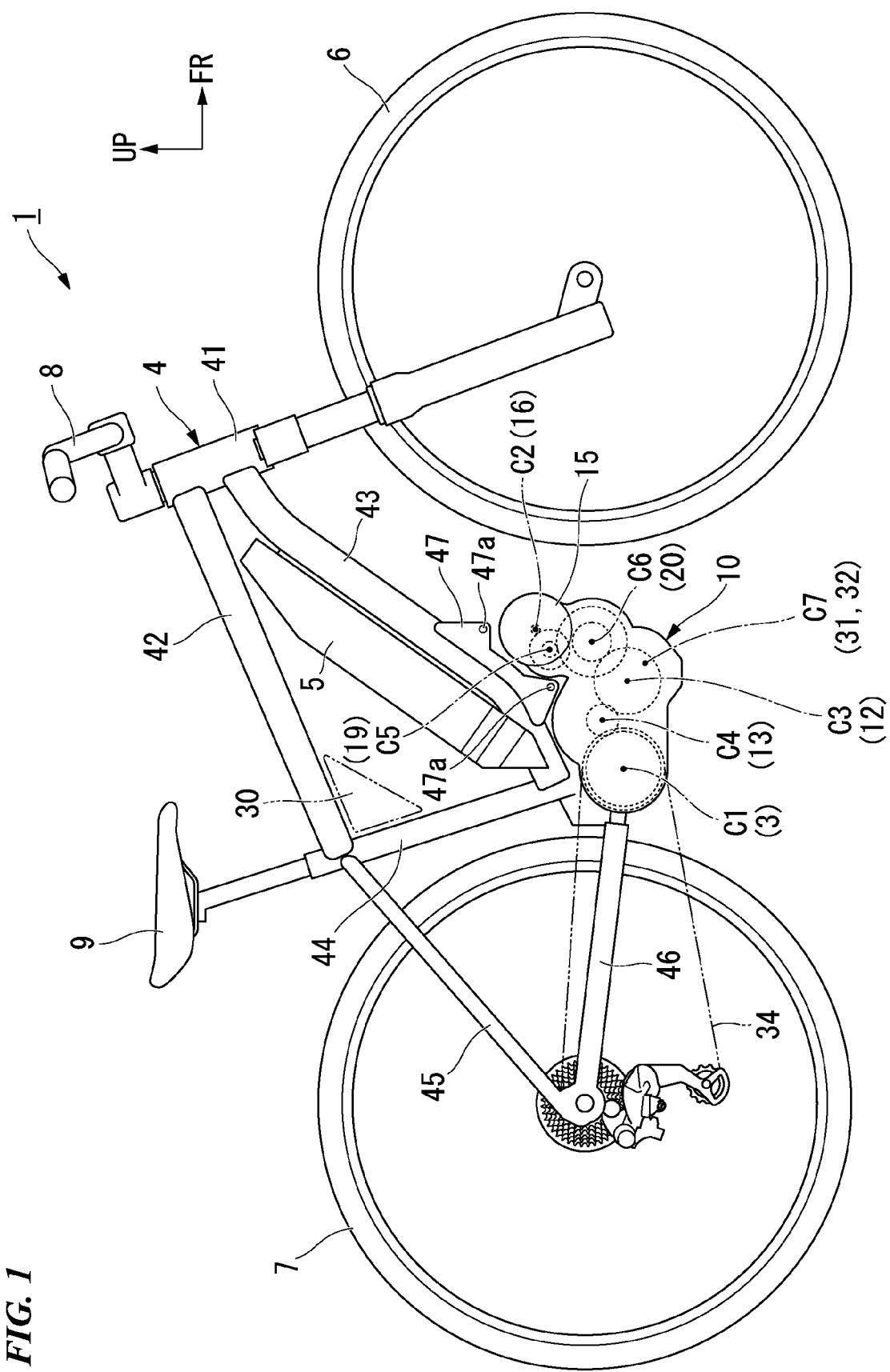
FIG. 1 is a right side view of a bicycle according to an embodiment of the invention.

Hereinafter, an embodiment of the invention will be described with reference to drawings. Also, directions such as forward, rearward, left, and right in the following description are the same as those with respect to a vehicle described below unless particularly indicated otherwise. In addition, arrows FR representing a forward direction with respect to the vehicle, arrows LH representing a leftward direction with respect to the vehicle, and arrows UP representing an upward direction with respect to the vehicle are shown at appropriate positions in the drawings used in the following description.

<Overall View of Vehicle>

As shown in FIG. 1, a bicycle 1 according to an embodiment is an electric assist bicycle that generates auxiliary power using an electric motor (assist motor) 15 in accordance with a stepping force applied to pedals. The bicycle 1 has a drive unit 10 mounted thereon at a lower side of a body frame 4 and a battery 5 mounted thereon along a down tube 43 of the body frame 4. The drive unit 10 may be used as an engine that causes the bicycle 1 to travel only with an output from the motor. The bicycle 1 includes a front wheel 6, a rear wheel 7, a handle 8, and a seat 9.

The body frame 4 is configured, for example, by integrally bonding a plurality of frame members made of an aluminum alloy through welding, fastening, and the like. The body frame 4 includes a head pipe 41 that supports a front wheel suspension system such that steering can be performed, a top tube 42 that extends from an upper portion to a lower rear side of the head pipe 41, a down tube 43 that extends from a lower portion of the head pipe 41 to the lower rear side with a steeper inclination than the top tube 42, a seat tube 44 that extends vertically between rear ends of the top tube 42 and the down tube 43, a left-right seat stay 45 that branches in left-right directions behind the rear end of the top tube 42 and extends to the lower rear side with a slightly steeper inclination than the top tube 42, and a left-right rear stay 46 that is branched in the left-right directions behind the rear end of the down tube 43 and extends substantially horizontally to the rear side.

The rear end of the top tube 42 is coupled to an upper end front side of the seat tube 44. The rear end of the down tube 43 is coupled to a lower end front side of the seat tube 44. A front end of the left-right seat stay 45 is coupled to an upper end rear side of the seat tube 44. A front end of the left-right rear stay 46 is coupled to a lower end of the seat tube 44 via a rear end of the drive unit 10, for example. The front end of the left-right rear stay 46 may be coupled to the lower end of the seat tube 44 via a separate frame member (lower bracket) without the drive unit 10 interposed therebetween.

A power control unit (PCU) 30 that controls the electric motor 15 of the drive unit 10 is disposed on a lower front side of a coupling portion between the top tube 42 and the seat tube 44 of the body frame 4. The battery 5 for driving the electric motor 15 is disposed on a rear surface side of the down tube 43. The PCU 30 and the battery 5 are disposed in a region surrounded by the head pipe 41, the top tube 42, the down tube 43, and the seat tube 44 in a side view of the body frame 4. The drive unit 10 in which the electric motor 15 and a power delivery mechanism 18 are integrated is disposed at a location from the lower front side of the down tube 43 to the lower end of the seat tube 44.

<Drive Unit>

Figure 2:
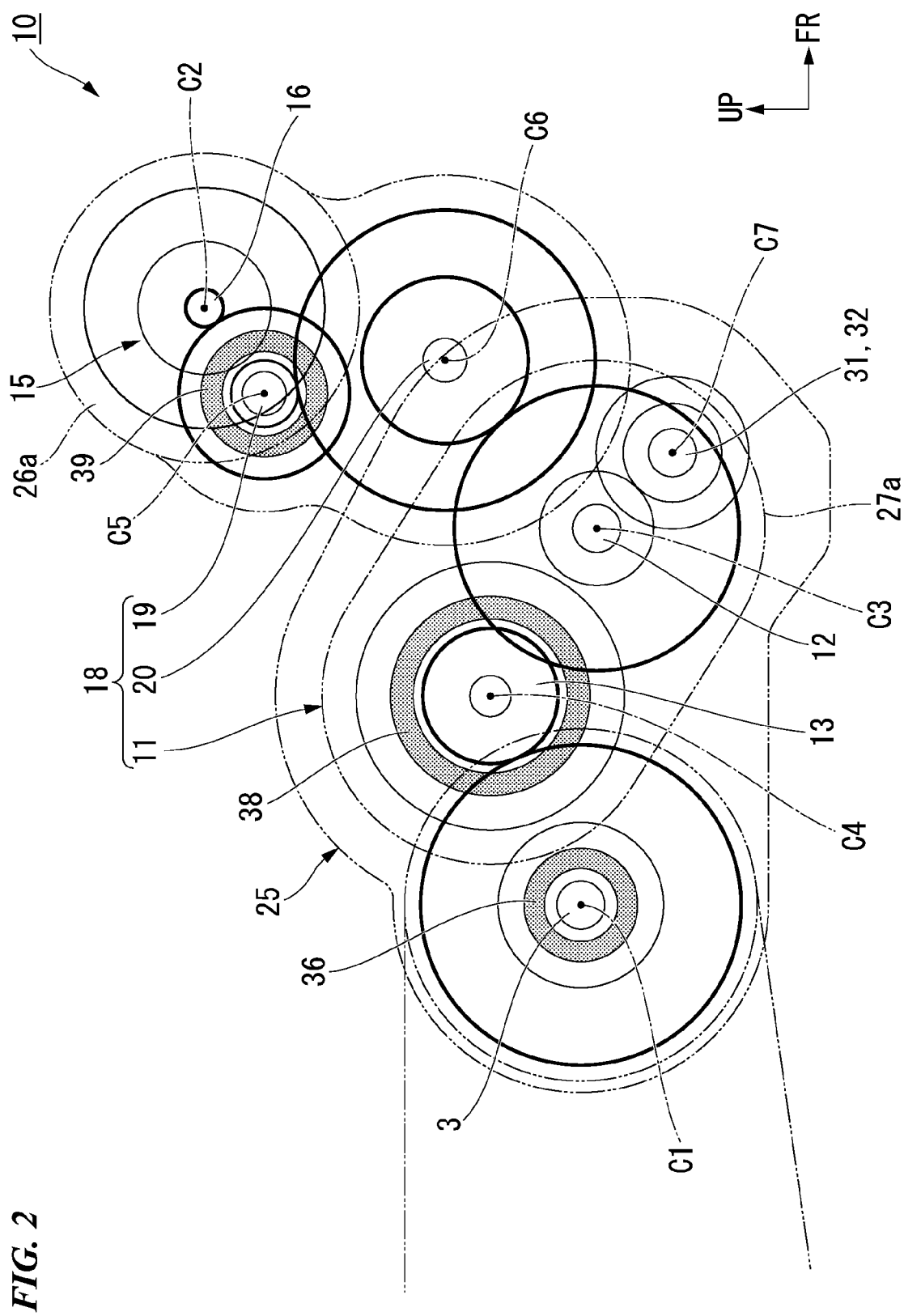
FIG. 2 is a right side view of a drive unit in the bicycle.
Figure 3:
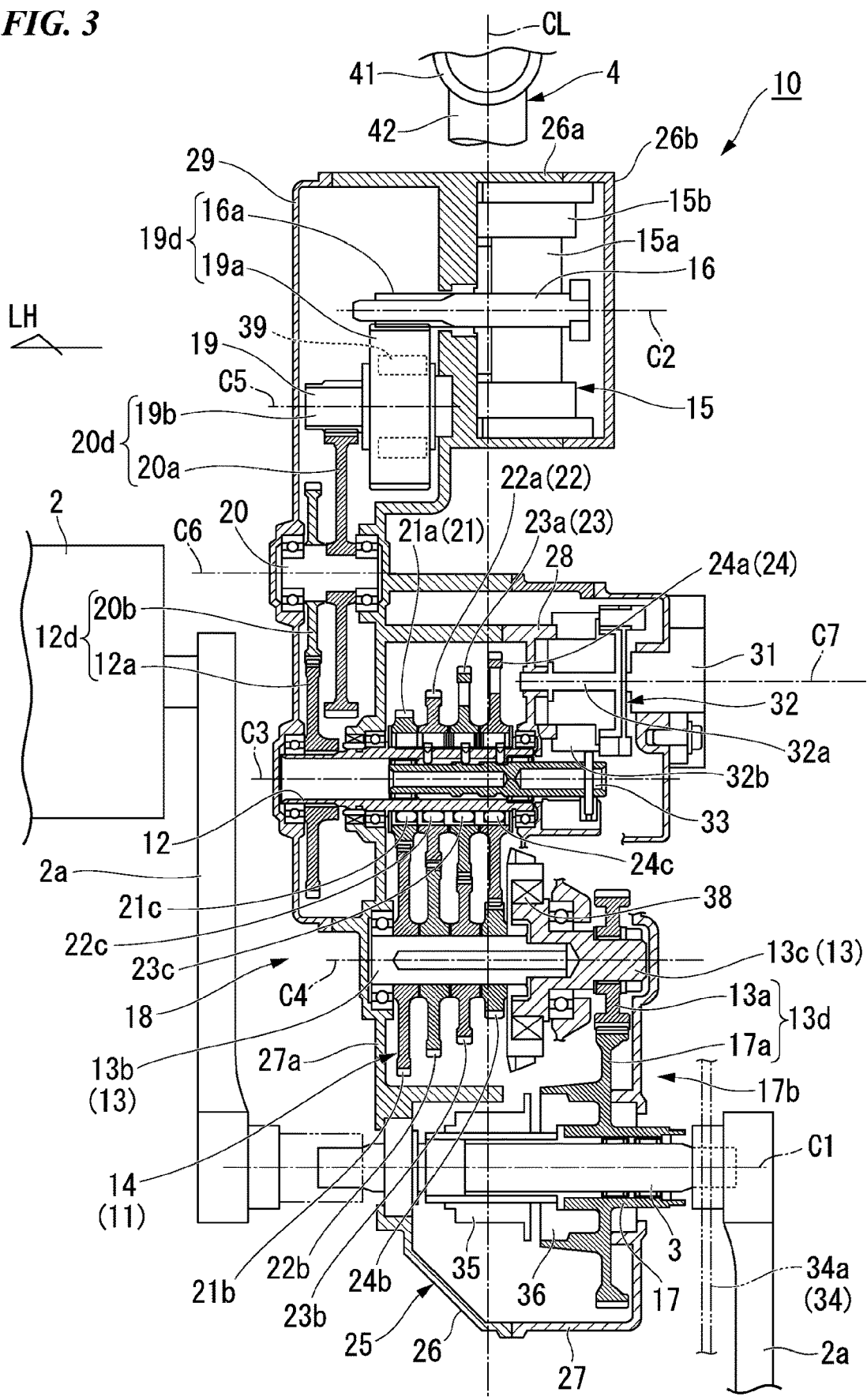
FIG. 3 is a sectional view connecting shaft centers of a plurality of rotation shafts in the drive unit.

As shown in FIGS. 2 and 3, the drive unit 10 includes the electric motor 15 on the upper front side of the pedal crankshaft 3. The electric motor 15 includes a motor drive shaft 16 that is parallel to the pedal crankshaft 3. The line CL in FIG. 3 represents a center of the vehicle in the left-right direction.

The drive unit 10 includes a transmission 11 on the front side of the pedal crankshaft 3 and on the lower rear side of the electric motor 15. The transmission 11 includes a main shaft (motor-side input shaft) 12 and a counter shaft (crank-side output shaft) 13 that are parallel to the pedal crankshaft 3. The main shaft 12 is disposed at substantially the same height (in detail, slightly below the pedal crankshaft 3 in the upward-downward direction) as that of the pedal crankshaft 3 in the upward-downward direction. The counter shaft 13 is disposed above the main shaft 12 and the pedal crankshaft 3 in the upward-downward direction.

The drive unit 10 includes a first relay shaft 19 and a second relay shaft 20 that are parallel to the pedal crankshaft 3 between the main shaft 12 and the motor drive shaft 16. The first relay shaft 19 is disposed on the lower rear side of the motor drive shaft 16. The second relay shaft 20 is a relay shaft located closer to of the main shaft 12 than the first relay shaft 19 and is disposed below the first relay shaft 19. The first relay shaft 19, the second relay shaft 20, and the transmission 11 configure the power delivery mechanism 18 in the drive unit 10.

A central shaft line C1 is a central shaft line of the pedal crankshaft 3. A central shaft line C2 is a central shaft line of the motor drive shaft 16. A central shaft line C3 is a central shaft line of the main shaft 12. A central shaft line C4 is a central shaft line of the counter shaft 13. A central shaft line C5 is a central shaft line of the first relay shaft 19. A central shaft line C6 is a central shaft line of the second relay shaft 20.

The pedal crankshaft 3, the transmission 11, the first relay shaft 19, the second relay shaft 20, and the electric motor 15 are accommodated and supported in a unit case 25. The unit case 25 is divided into a plurality of divided bodies in the left-right direction, for example. The respective divided bodies of the unit case 25 are integrally molded using an aluminum alloy, for example. Specifically, the unit case 25 is divided into a left case body 26 that forms a range from the electric motor 15 to the pedal crankshaft 3 in a side view, a right case body 27 that forms a range up to the transmission 11 and the pedal crankshaft 3 in a side view, a partitioning wall forming body 28 that is disposed in the left and right case bodies 26 and 27 and forms a transmission case 27a along with the right case body 27, and a left case cover 29 that covers, from the left side, a range from the electric motor 15 to the main shaft 12 in the left case body 26 in a side view.

Referring to FIG. 1 as well, the unit case 25 is secured to and supported by a mount bracket 47 provided on a lower front side of the down tube 43 of the body frame 4. The mount bracket 47 includes a pair of fastening portions 47a aligned along an inclination of the down tube 43 in a side view. A front upper portion of the unit case 25 is fastened and secured to the pair of fastening portions 47a via bolts or the like in a vehicle width direction (left-right direction).

Referring to FIG. 3, the electric motor 15 is a DC motor, for example. The electric motor 15 has a rotor 15a into which the motor drive shaft 16 is inserted such that the motor drive shaft 16 can integrally rotate therewith and a stator 15b that is secured to the inside of the motor accommodation portion 26a at the front upper portion of the left case body 26 on an outer circumference of the rotor 15a. The motor accommodation portion 26a opens on the left side, and a motor cover 26b is detachably attached to the open portion.

The transmission 11 includes a transmission gear group 14 of a constantly engaging type that is supported across the main shaft 12 and the counter shaft 13. The transmission gear group 14 is disposed in a transmission case 27a (oil chamber) and is appropriately dipped in oil stored in the transmission case 27a.

A driving torque (a motor torque and an assist torque) for the electric motor 15 is input to the main shaft 12 of the transmission 11 via the first relay shaft 19 and the second relay shaft 20. The motor torque that has undergone shift changing via the transmission gear group 14 is output from the counter shaft 13 of the transmission 11 to a transmission tube 17 supported on the pedal crankshaft 3. The transmission 11 performs shift changing on the output from the electric motor 15 to the pedal crankshaft 3. In this manner, the torque is efficiently acquired using a rated rotation frequency of the electric motor 15, and noise at the time of increasing the speed is curbed. In the case of a vehicle that travels using an output from a motor, the transmission 11 performs shift changing on an output from an output portion 17b to the rear wheel 7.

The main shaft 12 is hollow, and a transmission rod 33 is inserted into the main shaft 12 from a right end opening such that the transmission rod 33 can move in the axial direction. At a section located on the front lower side of the main shaft 12 in the right case body 27 in a side view, a transmission actuator 32 that causes the transmission rod 33 to move in the axial direction is disposed. The transmission actuator 32 has a drive shaft 32a that is parallel to the pedal crankshaft 3, for example, causes a guide groove 32b to rotate along with the drive shaft 32a, and causes the transmission rod 33 to stroke. The shift changing operation will be described later.

A gear position sensor 31 is disposed at a right outer portion of the transmission actuator 32 in the right case body 27. The gear position sensor 31 is an angle sensor that detects a rotational angle of the drive shaft 32a of the transmission actuator 32 and is disposed coaxially with the transmission actuator 32. The central shaft line C7 represents a central shaft line of the transmission actuator 32 and the gear position sensor 31.

The motor drive shaft 16 forms a pinion gear 16a on a left portion that projects on the left side of the motor accommodation portion 26a.

The right portion of the first relay shaft 19 supports a first large-diameter gear 19a that engages with the pinion gear 16a. The left portion of the first relay shaft 19 supports a first small-diameter gear 19b. The first relay shaft 19 supports the first large-diameter gear 19a via a fourth one-way clutch 39, which will be described later. The pinion gear 16a and the first large-diameter gear 19a configure a first deceleration gear pair 19d.

The right portion of the second relay shaft 20 supports a second large-diameter gear 20a that engages with the first small-diameter gear 19b. The left portion of the second relay shaft 20 supports a second small-diameter gear 20b. The first small-diameter gear 19b and the second large-diameter gear 20a configure a second deceleration gear pair 20d.

The left end of the main shaft 12 supports a third large-diameter gear 12a that engages with the second small-diameter gear 20b. The right portion of the main shaft 12, which faces the inside of the transmission case 27a, supports first to fourth gear drive gears 21a to 24a in the transmission gear group 14. The main shaft 12 supports the first to fourth gear drive gears 21a to 24a via first to fourth gear one-way clutches 36 to 39 (first to fourth one-way clutches), which will be described later. The second small-diameter gear 20b and the third large-diameter gear 12a configure a third deceleration gear pair 12d.

The counter shaft 13 divides a right portion as a shaft end rotation shaft 13c that can rotate relative to a counter shaft main body 13b that configures the left portion. The counter shaft main body 13b and the shaft end rotation shaft 13c are connected via a third one-way clutch 38, which will be described later. The counter shaft main body 13b faces the inside of the transmission case 27a and supports first to fourth gear driven gear 21b to 24b in the transmission gear group 14. The shaft end rotation shaft 13c supports a fourth small-diameter gear 13a.

The pedal crankshaft 3 supports the torque sensor 35 at the left portion thereof and supports the transmission tube 17 at the right portion thereof. The pedal crankshaft 3 supports the transmission tube 17 via a first one-way clutch 36, which will be described later. The transmission tube 17 supports a fifth large-diameter gear 17a that engages with the fourth small-diameter gear 13a. The fourth small-diameter gear 13a and the fifth large-diameter gear 17a configure a fourth deceleration gear pair 13d. The shaft end rotation shaft 13c, the fourth deceleration gear pair 13d, the transmission tube 17, and the pedal crankshaft 3 configure the output portion 17b of the drive unit 10.

The left and right ends of the pedal crankshaft 3 project to the outside of the unit case 25. Proximal ends of left and right pedal crank arms 2a are connected to the left and right ends of the pedal crankshaft 3, respectively, directly or via a connecting member such that the left and right pedal crank arms 2a can integrally rotate therewith. Left and right pedals 2 are supported at distal ends of the left and right pedal crank arms 2a, respectively.

Referring to FIG. 1 as well, a drive sprocket 34a of a chain-type transmission mechanism 34 stretched between the right pedal crankshaft 3 and the rear wheel 7 is supported at the right pedal crank arm 2a such that the drive sprocket 34a can integrally rotate therewith. The drive sprocket 34a of the chain-type transmission mechanism 34 is supported at a hub 7a of the rear wheel 7 via a second one-way clutch 37, which will be described later.

<One-Way Clutch>

Figure 4:
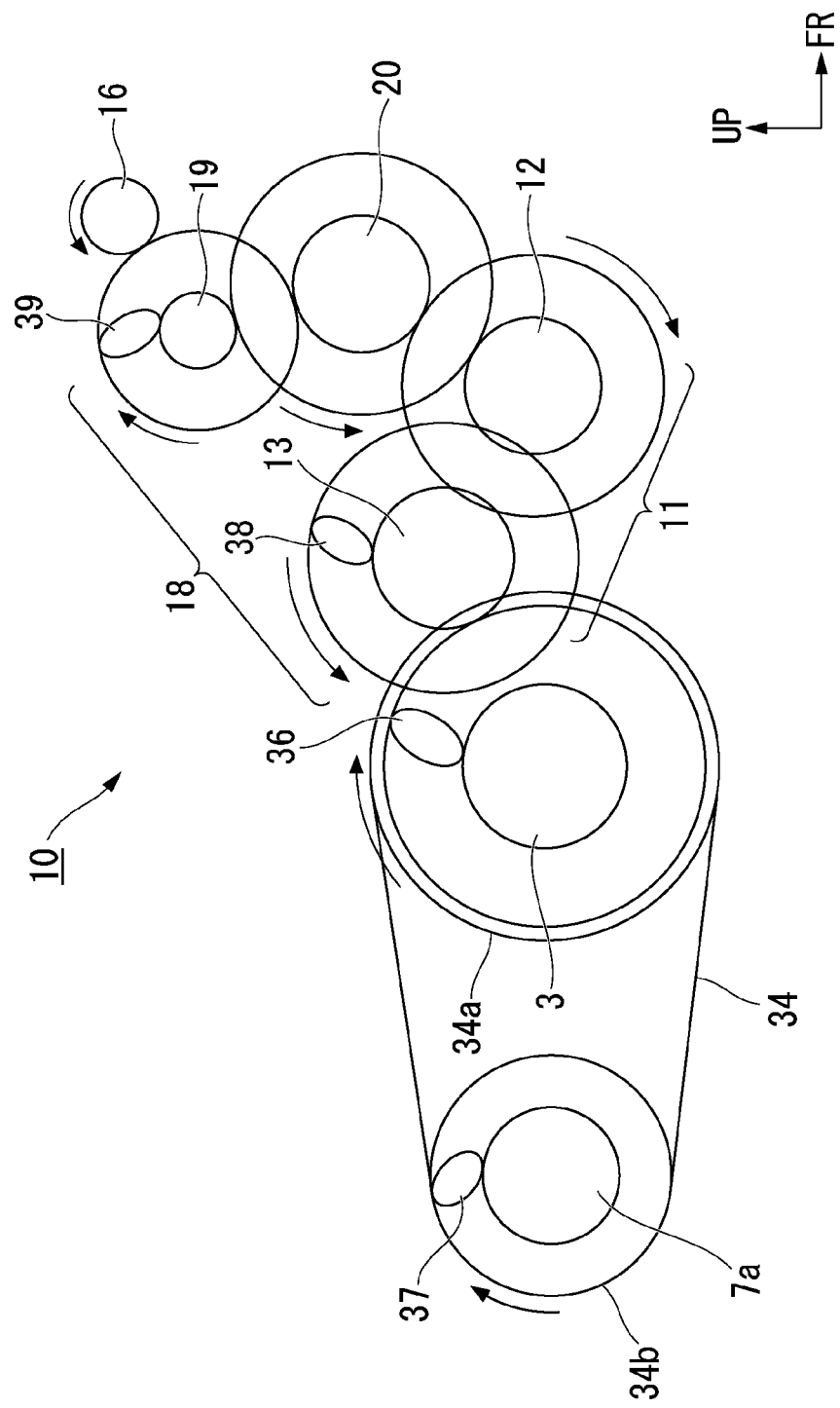
FIG. 4 is an explanatory diagram showing the drive unit and a rotational direction of a rear wheel shaft.

Referring to FIG. 4, the first one-way clutch 36 does not deliver a torque from the pedal crankshaft 3 to the transmission tube 17 when the pedal crankshaft 3 is about to relatively rotate in a forward rotation direction prior to the transmission tube 17 (in other words, when the rotation frequency of the pedal crankshaft 3 in the forward rotation direction is about to exceed the rotation frequency of the transmission tube 17 in the forward rotation direction). The "forward rotation direction" in the present application means a rotational direction of the respective shafts and the rotating bodies in which the vehicle is caused to advance forward. That is, when the pedals 2 are stepped on a side on which the vehicle is caused to advance forward in a stationary state (non-assisted state) of the transmission tube 17, the pedal crankshaft 3 idles with respect to the transmission tube 17. In this manner, the pedal crankshaft 3 can cause the drive sprocket 34a to rotate and drive the rear wheel 7 without causing the transmission tube 17 (and thus the transmission 11) to rotate.

The first one-way clutch 36 delivers a torque from the transmission tube 17 to the pedal crankshaft 3 when the transmission tube 17 is about to relatively rotate in the forward rotation direction prior to the crankshaft 3 (in other words, when the rotation frequency of the transmission tube 17 in the forward rotation direction is about to exceed the rotation frequency of the pedal crankshaft 3 in the forward rotation direction). That is, the motor torque that has been delivered to the transmission tube 17 can be delivered to the pedal crankshaft 3, and rotation (pedal stepping) of the pedal crankshaft 3 can be assisted in a driving state of the transmission tube 17 (assisted state).

In the bicycle 1, a drive force from the pedal crankshaft 3 is delivered from the right pedal crank arm 2a to the rear wheel 7 via the chain-type transmission mechanism 34 when the rider travels by stepping the pedals 2. If the electric motor 15 drives at that time, the drive force from the electric motor 15 is delivered to the transmission tube 17 via the power transmission mechanism 18, and assist is performed to reduce the pedal stepping force required.

In the bicycle 1, the drive force from the rear wheel 7 is blocked by the second one-way clutch 37 disposed at the rear wheel shaft (corresponding to the hub) 7a and the chain-type transmission mechanism 34 is not driven when the rider travels without applying the drive force to the rear wheel 7 by stopping the pedals 2, for example.

Referring to FIG. 3, the torque sensor 35 is a magnetostrictive torque sensor disposed at the pedal crankshaft 3 and detects a torsion strain caused when a torque is input to the pedal crankshaft 3. If there is an input of a torque (pedal torque) caused by a pedal stepping force from a section located further leftward than the torque sensor 35, then the pedal crankshaft 3 causes the rear wheel 7 to drive via the chain-type transmission mechanism 34 from a section located further rightward than the torque sensor 35.

At that time, if the torque sensor 35 detects a torque that is equal to or larger than a predetermined torque, then the PCU 30 (see FIG. 1) drives the electric motor 15, and an assist torque is input to the transmission tube 17. At that time, the first one-way clutch 36 delivers the assist torque, which has been input to the transmission tube 17, to the pedal crankshaft 3 when "the rotation frequency of the transmission tube 17 in the forward rotation direction">"the rotation frequency of the pedal crankshaft 3 in the forward rotation direction" is about to be satisfied. In this manner, the rotation of the pedal crankshaft 3 is assisted, and the pedal stepping force required is reduced.

The PCU 30 controls driving of the electric motor 15. The PCU 30 integrally includes an electric control unit (ECU) and a power driver unit (PDU). The ECU outputs a control signal to the PDU and causes the PDU to drive the electric motor 15 on the basis of inputs from the torque sensor 35 and a vehicle speed sensor and the like, which are not shown in the drawing. When the pedal torque is detected, the PCU 30 drives the electric motor 15 to reduce the pedal stepping force required within a range in which the vehicle speed is less than a predetermined speed.

<Torque Delivery>

Referring to FIGS. 3 and 4, the first one-way clutch 36 is disposed at the pedal crankshaft 3. The second one-way clutch 37 is disposed at the rear wheel shaft 7a. The third one-way clutch 38 is disposed at the counter shaft 13. The fourth one-way clutch 39 is disposed at the first relay shaft 19.

The first one-way clutch 36 is disposed between the pedal crankshaft 3 and the transmission tube 17 (and thus the transmission 11) and delivers an assist torque, which has been input to the transmission tube 17, to the pedal crankshaft 3 when "the rotation frequency of the transmission tube 17 in the forward rotation direction">"the rotation frequency of the pedal crankshaft 3 in the forward rotation direction" is about to be satisfied. The first one-way clutch 36 does not deliver the torque from the pedal crankshaft 3 to the transmission tube 17 (and thus the transmission 11) when "the rotation frequency of the pedal crankshaft 3 in the forward rotation direction">"the rotation frequency of the transmission tube 17 in the forward rotation direction" is about to be satisfied. In this manner, it is possible to cause the pedal crankshaft 3 to rotate without causing the transmission 11 to rotate and to drive the rear wheel 7 with the pedal torque.

The second one-way clutch 37 is disposed between a driven sprocket 34b of the chain-type transmission mechanism 34 and the rear wheel shaft 7a and delivers a torque from the driven sprocket 34b to the rear wheel shaft 7a when "the rotation frequency of the driven sprocket 34b in the forward rotation direction">"the rotation frequency of the rear wheel shaft 7a in the forward rotation direction" is about to be satisfied. In this manner, it is possible to drive the rear wheel shaft 7a and thus the rear wheel 7 with the torque input to the driven sprocket 34b.

The third one-way clutch 38 is disposed between the counter shaft main body 13b of the counter shaft (output shaft) 13 and the shaft end rotation shaft 13c that is closer to the transmission tube 17 in the transmission 11 and delivers a torque from the counter shaft 13 to the shaft end rotation shaft 13c when "the rotation frequency of the counter shaft main body 13b in the forward rotation direction">"the rotation frequency of the shaft end rotation shaft 13c in the forward rotation direction" is about to be satisfied. The third one-way clutch 38 does not deliver the torque from the shaft end rotation shaft 13c to the counter shaft 13 when "the rotation frequency of the shaft end rotation shaft 13c in the forward rotation direction">"the rotation frequency of counter shaft 13 in the forward rotation direction" is about to be satisfied.

The fourth one-way clutch 39 is disposed between the first relay shaft 19 and the first large-diameter gear 19a and functions similarly to the third one-way clutch 38. That is, the fourth one-way clutch 39 delivers a torque from the first large-diameter gear 19a to the first relay shaft 19 when "the rotation frequency of the first large-diameter gear 19a in the forward rotation direction">"the rotation frequency of the first relay shaft 19 in the forward rotation direction" is about to be satisfied, and does not deliver the torque from the first relay shaft 19 to the first large-diameter gear 19a when "the rotation frequency of the first relay shaft 19 in the forward rotation direction">"the rotation frequency of the first large-diameter gear 19a in the forward rotation direction" is about to be satisfied.

In a case in which only the fourth one-way clutch 39 of the third one-way clutch 38 and the fourth one-way clutch 39 is mounted, a torque loss due to friction increases. That is, if the third one-way clutch 38 is not provided, a part of the pedal torque is used for driving the transmission 11 during the non-assisted state in which pedal stepping is not assisted with the motor. Meanwhile, it is not necessary to drive the transmission 11 with the pedal torque during the non-assisted state, and a torque loss due to friction is reduced by mounting the third one-way clutch 38 at the counter shaft (output shaft) 13 of the transmission 11.

<Torque Flow>

Figure 5:
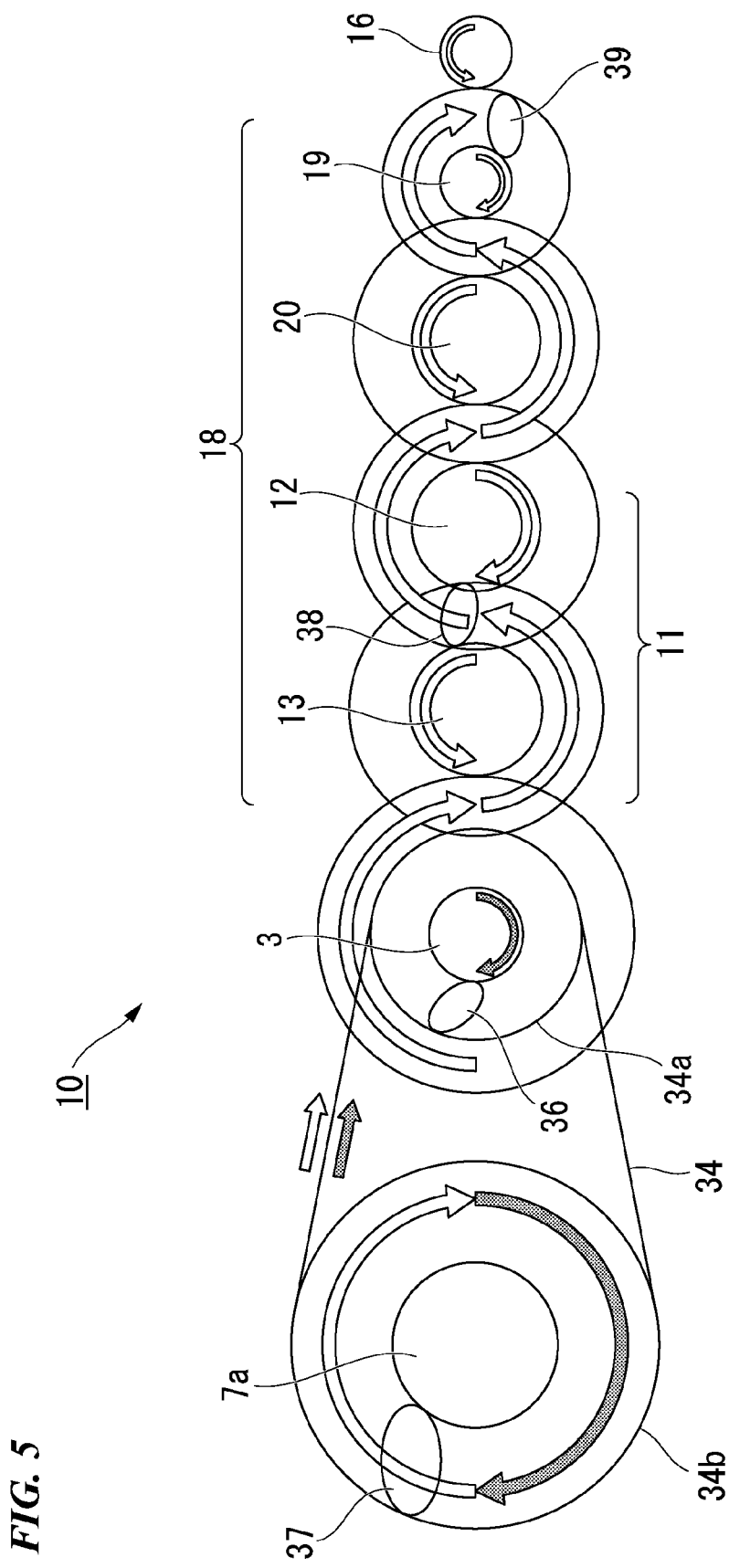
FIG. 5 is an explanatory diagram showing a torque flow of the drive unit and the rear wheel shaft during assisted driving.

Referring to FIG. 5, a torque flow during assisted driving will be described. The arrow in the drawing represents the forward rotation direction of the respective shafts and rotating bodies in a right side view of a motorcycle.

During the assisted driving, all the first one-way clutch 36, the second one-way clutch 37, the third one-way clutch 38, and the fourth one-way clutch 39 are turned on (torque delivered state).

That is, the torque from the electric motor 15 is delivered from the first deceleration gear pair 19d to the first relay shaft 19 via the fourth one-way clutch 39, is delivered to the second relay shaft 20 via the second deceleration gear pair 20d, and is further delivered to the main shaft 12 via the third deceleration gear pair 12d during the assisted driving.

The motor torque delivered to the main shaft 12 is delivered to the counter shaft main body 13b via a gear pair established in the transmission gear group 14 and is delivered to the shaft end rotation shaft 13c via the third one-way clutch 38. The motor torque delivered to the shaft end rotation shaft 13c is delivered to the transmission tube 17 via the fourth deceleration gear pair 13d and is delivered to the pedal crankshaft 3 via the first one-way clutch 36.

In this manner, rotation of the pedal crankshaft 3 is assisted with the motor torque, and thereafter, the rear wheel 7 is driven via the chain-type transmission mechanism 34 and the second one-way clutch 37.

The hatched arrow in the drawing indicates a driving direction of the respective parts with the pedal torque input to the pedal crankshaft 3.

Figure 6:
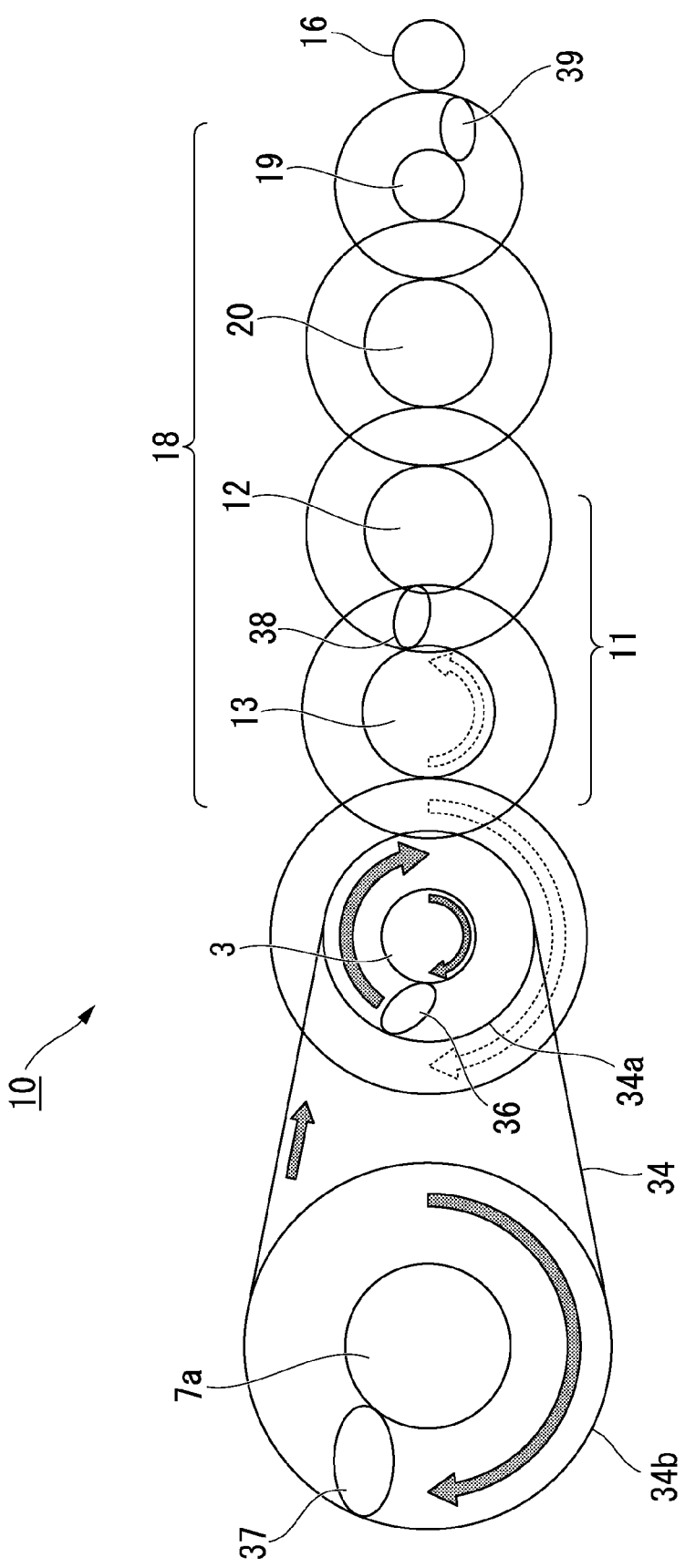
FIG. 6 is an explanatory diagram showing a torque flow of the drive unit and the rear wheel shaft during non-assisted driving.

Referring to FIG. 6, a torque flow during non-assisted driving will be described.

During the non-assisted driving, the first one-way clutch 36 and the second one-way clutch 37 are turned on, and the third one-way clutch 38 and the fourth one-way clutch 39 are turned off (torque non-delivered state).

That is, during the non-assisted driving, the electric motor 15 is stopped and does not generate any torque, and the first relay shaft 19, the second relay shaft 20, and the transmission 11 do not rotate. The pedal torque applied to the pedal crankshaft 3 is delivered to the driven sprocket 34b of the chain-type transmission mechanism 34, and the rear wheel 7 is driven via the second one-way clutch 37 when "the rotation frequency of the driven sprocket 34b in the forward rotation direction">"the rotation frequency of the rear wheel shaft 7a in the forward rotation direction" is about to be satisfied. The delivery of the pedal torque to the side of the transmission 11 is blocked by the third one-way clutch 38 idling.

<Transmission>

Figure 7B:
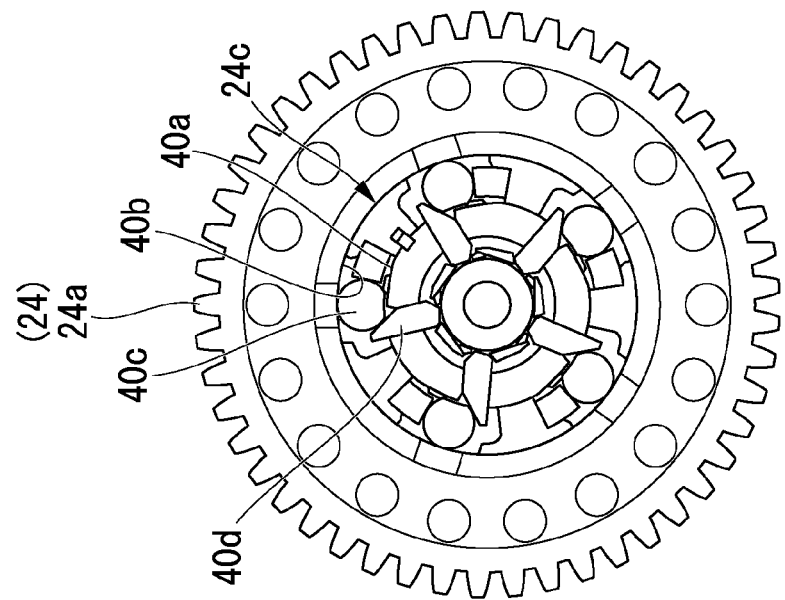
FIG. 7B is an explanatory diagram of the transmission in the drive unit and is a side view of a drive gear and a one-way clutch when seen in the axial direction of the main shaft.
Figure 7A:
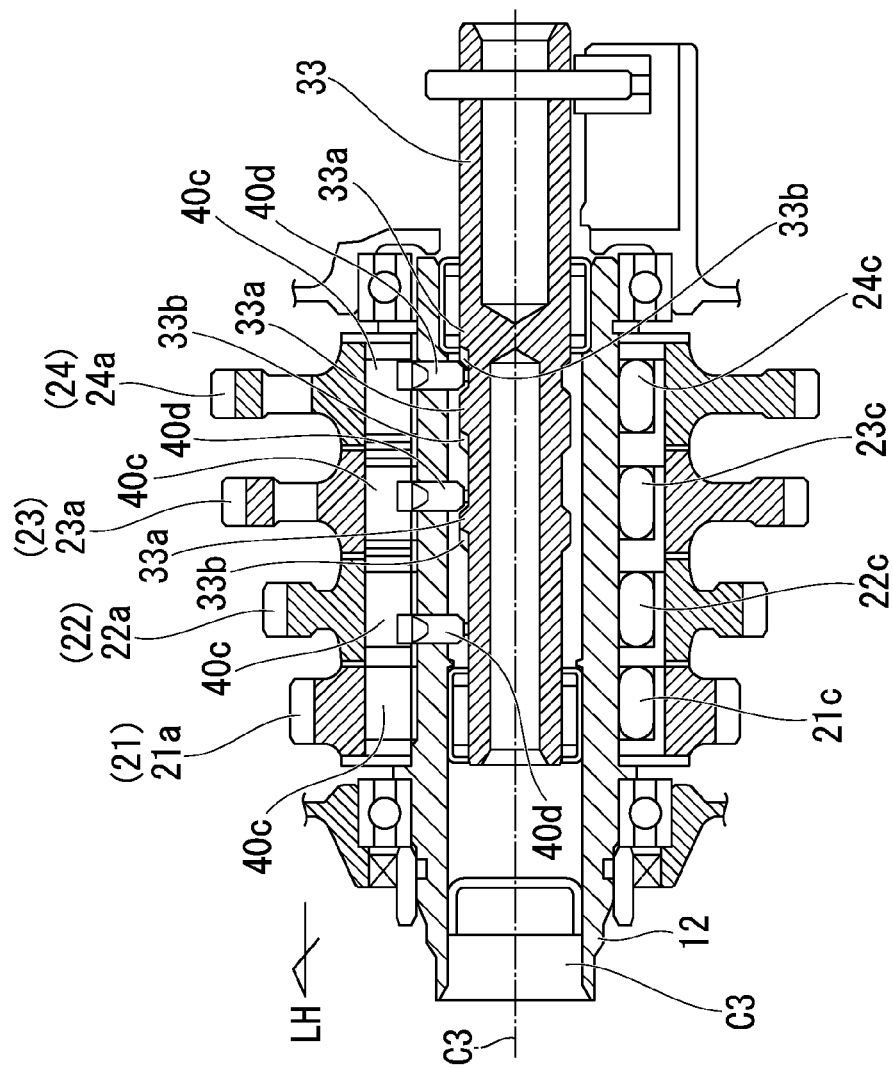
FIG. 7A is an explanatory diagram of a transmission in the drive unit and is a sectional view along an axial direction of a main shaft.

Referring to FIGS. 7A and 7B, a configuration and a shift changing operation of the transmission 11 will be described.

The transmission gear group 14 of the transmission 11 is configured of a plurality of drive gears 21a to 24a supported at the main shaft 12 and a plurality of driven gears 21b to 24b supported at the counter shaft 13. Corresponding gears in the plurality of drive gears 21a to 24a and the plurality of driven gears 21b to 24b engage with each other and configure gear arrays 21 to 24 corresponding to the number of shift changing stages (four gears).

In the example shown in the drawing, a first gear array 21, a second gear array 22, a third gear array 23, and a fourth gear array 24 are configured in this order from the right side. The gear arrays 21 to 24 corresponding to the four gears have decreasing deceleration ratios in the order of the first gear array 21, the second gear array 22, the third gear array 23, and the fourth gear array 24 and have increasing rotation frequencies of the counter shaft 13 with respect to the rotation frequency of the main shaft 12. One of the gear arrays 21 to 24 corresponding to the four gears is selected in accordance with the shift changing stage of the transmission 11 and is used for delivering a torque.

The transmission 11 selects a gear array to be used for delivering a torque by causing a transmission rod 33 inserted into the hollow main shaft 12 from the right end to move in the axial direction through an operation of the transmission actuator 32. The operation of the transmission 11 is performed by the rider manipulating a transmission manipulator, which is not shown in the drawing, for example. Also, the transmission is not limited to manual transmission, and automatic transmission may be able to be performed.

The first drive gear 21a is supported at the main shaft 12 via the first gear one-way clutch 21c. The second gear drive gear 22a, the third gear drive gear 23a, and the fourth gear drive gear 24a are supported at the main shaft 12 via the second gear one-way clutch 22c, the third gear one-way clutch 23c, and the fourth gear one-way clutch 24c, respectively. The respective one-way clutches 21c to 24c deliver only a motor torque in the forward rotation direction to the corresponding driven gears if the motor torque is input to the main shaft 12.

The second gear one-way clutch 22c, the third gear one-way clutch 23c, and the fourth gear one-way clutch 24c are switched between an on state (one-way operating state) in which only the motor torque in the forward rotation direction can be delivered to the corresponding driven gears and an off state (free state) in which even the motor torque in the forward rotation direction is not delivered to the corresponding driven gear and the clutches idle, through movement of the transmission rod 33 in the axial direction.

Each of the one-way clutches 21c to 24c includes an inner part 40a on the side of the main shaft 12, an outer part 40b on the side of the drive gear, and a roller 40c that is engaged between the inner part 40a and the outer part 40b during a one-way operation. Each of the second gear one-way clutch 22c, the third gear one-way clutch 23c, and the fourth gear one-way clutch 24c further includes a transmission pin 40d that causes the roller 40c to retreat from the engaging position between the inner part 40a and the outer part 40b.

The transmission pin 40d projects between the inner part 40a and the outer part 40b by running on an axial direction cam 33a provided so as to project from an outer circumference of the transmission rod 33. At that time, the transmission pin 40d brings a target one-way clutch into a free state by pushing the roller 40c away from the engaging position. The transmission pin 40d retreats from the position between the inner part 40a and the outer part 40b by the transmission rod 33 moving in the axial direction and coming down from the axial direction cam 33a.

At that time, the transmission pin 40d releases the pushing of the roller 40c to enable the roller 40c to be disposed at the engaging position and brings the target one-way clutch into a one-way operating state.

Even if the transmission pin 40d project during driving of the motor (during delivery of a torque), it is not possible to push the roller 40c away with the axial direction cam 33a and to bring the one-way clutch into a free state due to a load applied to the engaged roller 40c. Therefore, a rotational direction cam 33b that enables the one-way clutch to be brought into the free state using a drive force of the main shaft 12 is provided at an outer circumference of the transmission rod 33.

Figure 8A:
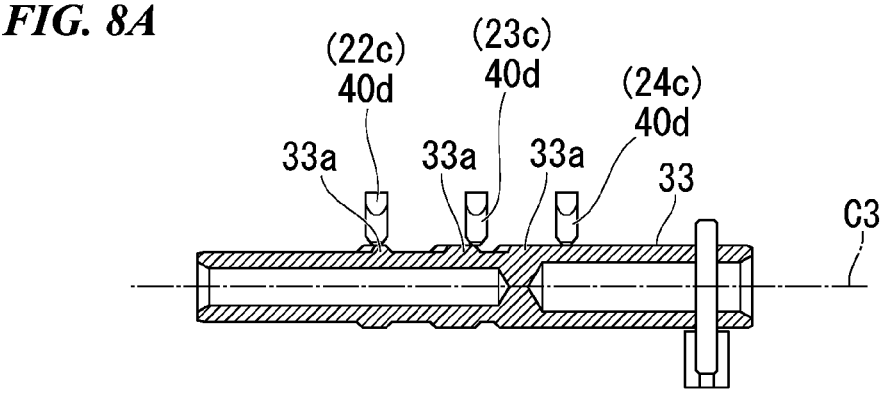
FIG. 8A is a sectional view of the surroundings of a transmission shaft of the transmission in the axial direction and shows a first gear state.

FIG. 8A shows a first gear state (low-gear state) of the transmission 11. In the low-gear state, each of the second gear one-way clutch 22c, the third gear one-way clutch 23c, and the fourth gear one-way clutch 24c is brought into a free state by the transmission pin 40d running on the axial direction cam 33a of the transmission rod 33.

Therefore, the first gear array 21 is used via the first gear one-way clutch 21c for delivering a torque between the main shaft 12 and the counter shaft 13. If the counter shaft 13 rotates, then the second gear array 22, the third gear array 23, and the fourth gear array 24 also rotate, but the drive gear merely idles on the main shaft 12 in these gear arrays 22 to 24.

Figure 8B:
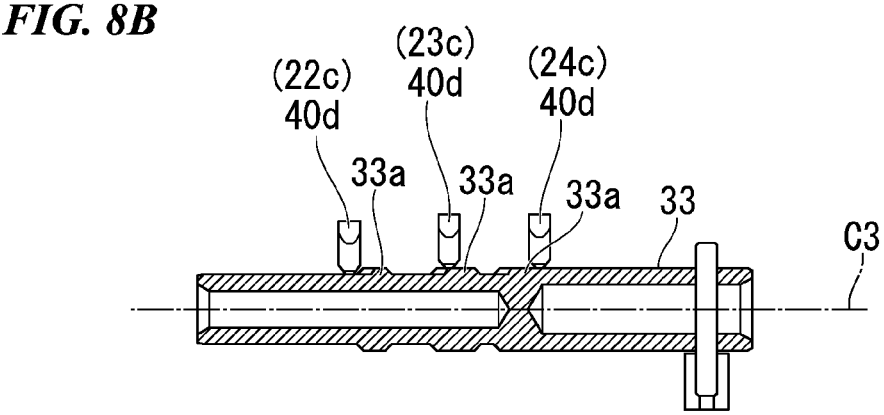
FIG. 8B is a sectional view of the surroundings of the transmission shaft of the transmission in the axial direction and shows a second gear state.

FIG. 8B shows a second gear state of the transmission 11. In the second gear state, the transmission pin 40d of the second gear one-way clutch 22c comes down from the axial direction cam 33a. In this manner, the second gear one-way clutch 22c is brought into a one-way operating state in which only a motor torque in the forward rotation direction can be delivered from the main shaft 12 to the second gear. The third gear one-way clutch 23c and the fourth gear one-way clutch 24c are in a free state in which the transmission pin 40d has still run on the axial direction cam 33a of the transmission rod 33.

Therefore, the first gear array 21 is used via the first gear one-way clutch 21c, or the second gear array 22 is used via the second gear one-way clutch 22c, for delivering the torque between the main shaft 12 and the counter shaft 13. In practice, the second gear array 22 is used via the second gear one-way clutch 22c for delivering the torque between the main shaft 12 and the counter shaft 13. Since the rotation frequencies of the respective driven gears 21b to 24b of the counter shaft 13 are the same, the rotation frequency of the first gear drive gear 21 increases in the first gear array 21, and the first gar drive gear 21a rotates (idles) on the main shaft 12 prior to the main shaft 12. In the third gear array 23 and the fourth gear array 24, the drive gears merely idle on the main shaft 12.

Figure 8C:
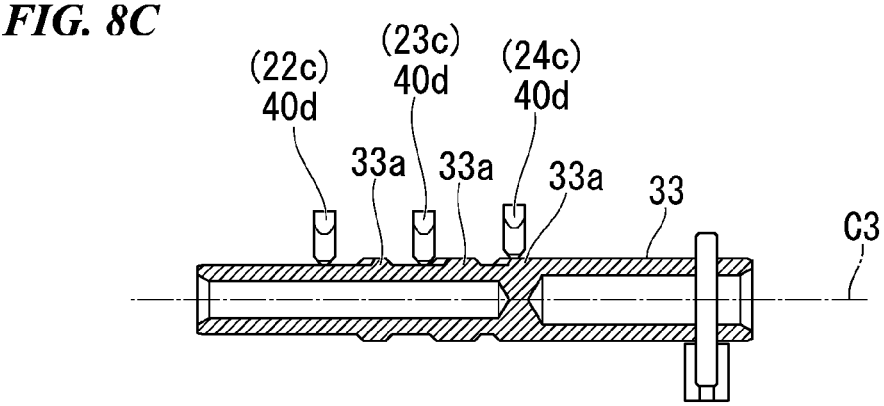
FIG. 8C is a sectional view of the surroundings of the transmission shaft of the transmission in the axial direction and shows a third gear state.

FIG. 8C shows a third gear state of the transmission 11. In the third gear state, the transmission pin 40d of the third gear one-way clutch 23c further comes down from the axial direction cam 33a. In this manner, the third gear one-way clutch 23c is brought into a one-way operating state in which only the motor torque in the forward rotation direction can be delivered from the main shaft 12 to the third gear. The fourth gear one-way clutch 24c is in a free state in which the transmission pin 40d has still run on the axial direction cam 33a of the transmission rod 33.

Therefore, the third gear array 23 is used via the third gear one-way clutch 23c for delivering the torque between the main shaft 12 and the counter shaft 13. In the first gear array 21 and the second gear array 22, the first gear and the second gear with increasing rotation frequencies rotate (idle), respectively, on the main shaft 12 prior to the main shaft 12. In the fourth gear array 24, the drive gear merely idles on the main shaft 12.

Figure 8D:
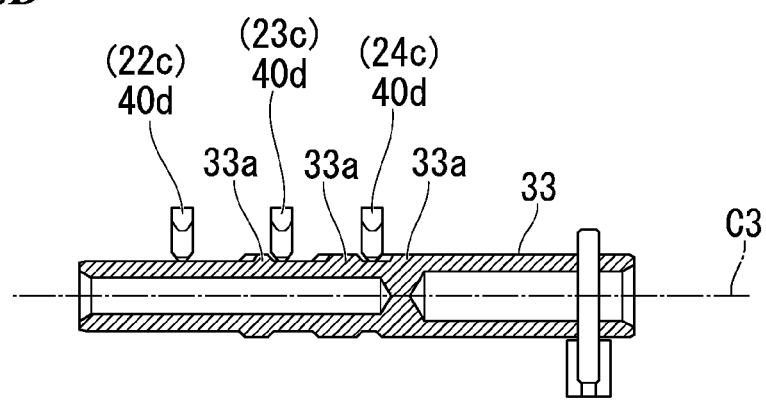
FIG. 8D is a sectional view of the surroundings of the transmission shaft of the transmission in the axial direction and shows a fourth gear state.

FIG. 8D shows a fourth gear state (top gear state) of the transmission 11. In the top gear state, the transmission pin 40d of the fourth gear one-way clutch 24c further comes down from the axial direction cam 33a. In this manner, the fourth gear one-way clutch 24c is brought into a one-way operating state in which only the motor torque in the forward rotation direction can be delivered from the main shaft 12 to the fourth gear.

Therefore, the fourth gear array 24 is used via the fourth gear one-way clutch 24c for delivering the torque between the main shaft 12 and the counter shaft 13. In the first gear array 21, the second gear array 22, and the third gear array 23, the first gear, the second gear, and the third gear with increasing rotational frequencies rotate (idle), respectively, on the main shaft 12 prior to the main shaft 12.

In the embodiment, the rotational direction of the respective shafts and rotating bodies in the transmission 11 does not change (inverted) before and after a gear array corresponding to a shift changing stage is selected. Therefore, it is possible to smoothly and quickly perform a shift changing operation as compared with a configuration in which the transmission 11 performs stopping of rotation of a shaft or the like or inversion of the rotational direction before and after the shift changing.

As described above, the drive unit 10 according to the embodiment includes the pedal crankshaft 3 to which a pedal stepping force of a rider is applied, the electric motor 15 that detects a torque input to the pedal crankshaft 3 and generates a drive force, and the transmission 11 that performs shift changing on the drive force from the electric motor 15 and delivers the drive force to the pedal crankshaft 3, the transmission 11 includes the main shaft 12 that supports the plurality of drive gears 21a to 24a and the counter shaft 13 that supports the plurality of driven gears 21b to 24b that engage with the plurality of respective drive gears 21a to 24a, and the transmission 11 selects one torque delivery gear among the plurality of drive gears 21a to 24a, delivers the drive force from the electric motor 15 to the counter shaft 13, and shifts the torque delivery gear without inverting rotational directions of the drive gears 21a to 24a.

With this configuration, it is possible to perform shift changing while the electric motor 15 and the main shaft 12 and the counter shaft 13 of the transmission 11 rotate in the same direction without inverting the rotational directions before and after the shift changing and to thereby cause the electric motor 15 and the main shaft 12 and the counter shaft 13 of the transmission 11 to smoothly operate. That is, the drive unit 10 according to the embodiment can smoothly perform a continuous shift changing operation without interrupting pedaling assist for the rider as compared with a configuration in which shift changing is performed by inversely rotating the motor as in the related art.

The drive unit 10 according to the embodiment includes, on the power delivery path from the electric motor 15 to the pedal crankshaft 3, the first one-way clutch 36, the third one-way clutch 38, and the fourth one-way clutch 39 that block delivery of the pedal torque, which has been input to the pedal crankshaft 3, to the side of the electric motor 15.

With this configuration, it is possible to prevent the pedal torque from being delivered to the side of the electric motor 15, to prevent the electric motor 15 and the like from rotating, and thereby to curb a torque loss due to friction when the pedal stepping of the rider is accelerated, and a rotation speed of the pedal crankshaft 3 increases.

The drive unit 10 according to the embodiment includes, on a delivery path from the counter shaft 13 to the pedal crankshaft 3, the first one-way clutch 36 and the third one-way clutch 38.

With this configuration, it is possible to prevent the pedal torque from being delivered to the side of the transmission 11, to prevent the transmission 11 from rotating, and thereby to curb a torque loss due to friction when the pedal stepping of the rider is accelerated, and a rotation speed of the pedal crankshaft 3 increases.

The drive unit 10 according to the embodiment includes the third one-way clutch 38 coaxially with the counter shaft 13.

With this configuration, it is possible to dispose the third one-way clutch 38 using spare space in the surroundings of the transmission 11 having the plurality of gears and thereby to downsize the drive unit 10 by disposing the third one-way clutch 38 coaxially with the counter shaft 13.

In the drive unit 10 according to the embodiment, the counter shaft 13 is disposed above the pedal crankshaft 3 and the main shaft 12.

With this configuration, it becomes easier to secure a minimum height from the ground, and it is possible to curb the length in the forward-backward direction from the transmission 11 to the pedal crankshaft 3 by disposing the counter shaft 13 above the pedal crankshaft 3 and the main shaft 12.

In the drive unit 10 according to the embodiment, the main shaft 12 is disposed below the pedal crankshaft 3, and the drive shaft 16 of the electric motor 15 is disposed above the main shaft 12.

With this configuration, it is possible to reduce the length of the entire drive unit 10 in the forward-backward direction and to downsize the drive unit 10 by disposing the main shaft 12 below the pedal crankshaft 3 and disposing the electric motor 15 above the main shaft 12.

In the drive unit 10 according to the embodiment, the drive shaft 16 of the electric motor 15 is disposed further forward than the pedal crankshaft 3.

With this configuration, it is possible to efficiently dispose the electric motor 15 by disposing the electric motor 15 further forward than the pedal crankshaft 3 in a configuration in which a rear wheel 7 is disposed behind the pedal crankshaft 3.

In the drive unit 10 according to the embodiment, the main shaft 12 is disposed further forward than the pedal crankshaft 3.

With this configuration, it is possible to efficiently dispose the main shaft 12 by disposing the main shaft 12 further forward than the pedal crankshaft 3 in a configuration in which a rear wheel 7 is disposed behind the pedal crankshaft 3.

In the drive unit 10 according to the embodiment, the transmission 11 includes the gear position sensor 31.

With this configuration, it is possible to detect a gear position in stepped shift changing using a plurality of gears and to use the gear position for fine control of the electric motor 15.

In the drive unit 10 according to the embodiment, the gear position sensor 31 is disposed below the main shaft 12.

With this configuration, it is possible to dispose the gear position sensor 31 using spare space in the surroundings of the transmission 11 having a plurality of gears and to downsize the drive unit 10 by disposing the gear position sensor 31 below the main shaft 12.

The drive unit 10 according to the embodiment includes, on a delivery path from the electric motor 15 to the main shaft 12, the first to third deceleration gear pairs 19d, 20d, and 12d.

With this configuration, it is possible to deliver the drive force from the electric motor 15 to the transmission 11 after appropriately decelerating and adjusting the drive force.

Also, the invention is not limited to the aforementioned embodiments, and for example, the drive unit 10 may be used as an engine for a so-called moped capable of causing a vehicle to travel only with an output from a motor.

In addition, the configurations in the aforementioned embodiment are just examples of the invention, and various modifications such as replacement of components in the embodiments with known components can also be made without departing from the scope of the invention.

What is claimed is:

1. A drive unit comprising:
   a pedal crankshaft to which a pedal stepping force of a rider is applied;
   an electric motor that detects a torque input to the pedal crankshaft and generates a drive force;
   a transmission that changes shift of the drive force of the electric motor and delivers the drive force to the pedal crankshaft; and
   a one-way clutch that is provided on a power delivery path from the electric motor to the pedal crankshaft and blocks delivery of a pedal torque, which has been input to the pedal crankshaft, to a side of the electric motor, wherein the transmission includes
a main shaft that supports a plurality of drive gears and
a counter shaft that supports a plurality of driven gears that engage with the plurality of respective drive gears,
the transmission selects one torque delivery gear from the plurality of drive gears, delivers the drive force of the electric motor to the counter shaft, and shifts the torque delivery gear without inverting a rotational direction of the drive gear, and
the one-way clutch is provided coaxially with the counter shaft.

2. The drive unit according to claim 1,
wherein the one-way clutch is provided on a delivery path from the counter shaft to the pedal crankshaft.

3. The drive unit according to claim 1,
wherein the counter shaft is disposed above the pedal crankshaft and the main shaft.

4. The drive unit according to claim 1,
wherein the main shaft is disposed below the pedal crankshaft, and a drive shaft of the electric motor is disposed above the main shaft.

5. The drive unit according to claim 1,
wherein a drive shaft of the electric motor is disposed further forward than the pedal crankshaft.

6. The drive unit according to claim 1,
wherein the main shaft is disposed further forward than the pedal crankshaft.

7. The drive unit according to claim 1,
wherein the transmission includes a gear position sensor.

8. The drive unit according to claim 7,
wherein the gear position sensor is disposed below the main shaft.

9. The drive unit according to claim 1, further comprising:
a deceleration gear pair on a delivery path from the electric motor to the main shaft.

\* \* \* \* \*